(12) United States Patent
Proksa

(10) Patent No.: US 11,156,725 B2
(45) Date of Patent: Oct. 26, 2021

(54) DETECTOR ARRANGEMENT FOR AN X-RAY PHASE CONTRAST SYSTEM AND METHOD FOR X-RAY CONTRAST IMAGING

(71) Applicant: KONINKLIJKE PHILIPS N.V., Eindhoven (NL)

(72) Inventor: Roland Proksa, Neu Wulmstorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 104 days.

(21) Appl. No.: 16/498,532

(22) PCT Filed: Mar. 27, 2018

(86) PCT No.: PCT/EP2018/057828
§ 371 (c)(1),
(2) Date: Sep. 27, 2019

(87) PCT Pub. No.: WO2018/178107
PCT Pub. Date: Oct. 4, 2018

(65) Prior Publication Data
US 2020/0033484 A1    Jan. 30, 2020

(30) Foreign Application Priority Data
Mar. 27, 2017    (EP) .................................. 17163089

(51) Int. Cl.
*G01T 1/20* (2006.01)
*G21K 1/06* (2006.01)
(Continued)

(52) U.S. Cl.
CPC ......... *G01T 1/2006* (2013.01); *G01N 23/041* (2018.02); *G01T 1/2002* (2013.01);
(Continued)

(58) Field of Classification Search
CPC ....... G01T 1/00; G01T 1/2002; G01T 1/2006; G21K 1/025; G21K 1/067; G21K 1/16;
(Continued)

(56) References Cited

U.S. PATENT DOCUMENTS 4,413,353 A * 11/1983 Macovski ............ G01N 23/041
378/62
2016/0161427 A1    6/2016 Butler
(Continued)

FOREIGN PATENT DOCUMENTS

WO    WO2016163177 A1    10/2016
WO    WO2017212000 A1    12/2017

OTHER PUBLICATIONS

PCT International Search Report, International application No. PCT/EP2018/057828, dated Jul. 9, 2018.
(Continued)

*Primary Examiner* — Chih-Cheng Kao
(74) *Attorney, Agent, or Firm* — Larry Liberchuk

(57) ABSTRACT

The present invention relates to a detector arrangement for an X-ray phase contrast system (5), the detector arrangement (1) comprising: a scintillator (11); an optical grating (12); and a detector (13); wherein the optical grating (12) is arranged between the scintillator (11) and the detector (13); wherein the scintillator (11) converts X-ray radiation (2) into optical radiation (3); wherein the optical grating (12) is configured to be an analyzer grating being adapted to a phase-grating (21) of an X-ray phase contrast system (5); wherein the optical path between the optical grating (12) and the scintillator (11) is free of focusing elements for optical radiation. The present invention further relates to a method (100) for performing X-ray phase contrast imaging with a detector arrangement (1) mentioned above. The invention
(Continued)

avoids the use of an X-ray absorption grating as G2 grating in an X-ray phase contrast interferometer system.

13 Claims, 5 Drawing Sheets

(51) Int. Cl.
- *G21K 1/16* (2006.01)
- *G01N 23/041* (2018.01)
- *G21K 4/00* (2006.01)

(52) U.S. Cl.
CPC ............... *G21K 1/067* (2013.01); *G21K 1/16* (2013.01); *G21K 4/00* (2013.01); *G21K 2004/06* (2013.01); *G21K 2201/067* (2013.01); *G21K 2207/005* (2013.01)

(58) Field of Classification Search
CPC ....... G21K 2201/067; G21K 2207/005; G01N 23/041
See application file for complete search history.

(56) References Cited

U.S. PATENT DOCUMENTS

| | | |
|---|---|---|
| 2017/0038481 A1 | 2/2017 | Cheng |
| 2017/0307549 A1* | 10/2017 | Hesselink ............ A61B 6/4241 |
| 2018/0279972 A1* | 10/2018 | Tanabe ................. A61B 6/4208 |
| 2019/0304616 A1* | 10/2019 | Koehler ................. G21K 1/025 |

OTHER PUBLICATIONS

Lilu X. et al, "A New Method of Detecting Interferogram in Differential Phase-Contrast Imaging System based on Special Structured X-Ray Scintillator Screen", 2010 Chinese Physical Society and IOP Publishing Ltd., B, vol. 19, No. 7, (2010), pp. 070701-1-070701-5.

Qiang Y. et al., "Experimental Study of X-Ray Phase Contrast Imaging without Absorbing Grating;", Acta Phys. Sin. vol. 61, No. 16, 2012, pp. 160702-1-160702-5.

* cited by examiner

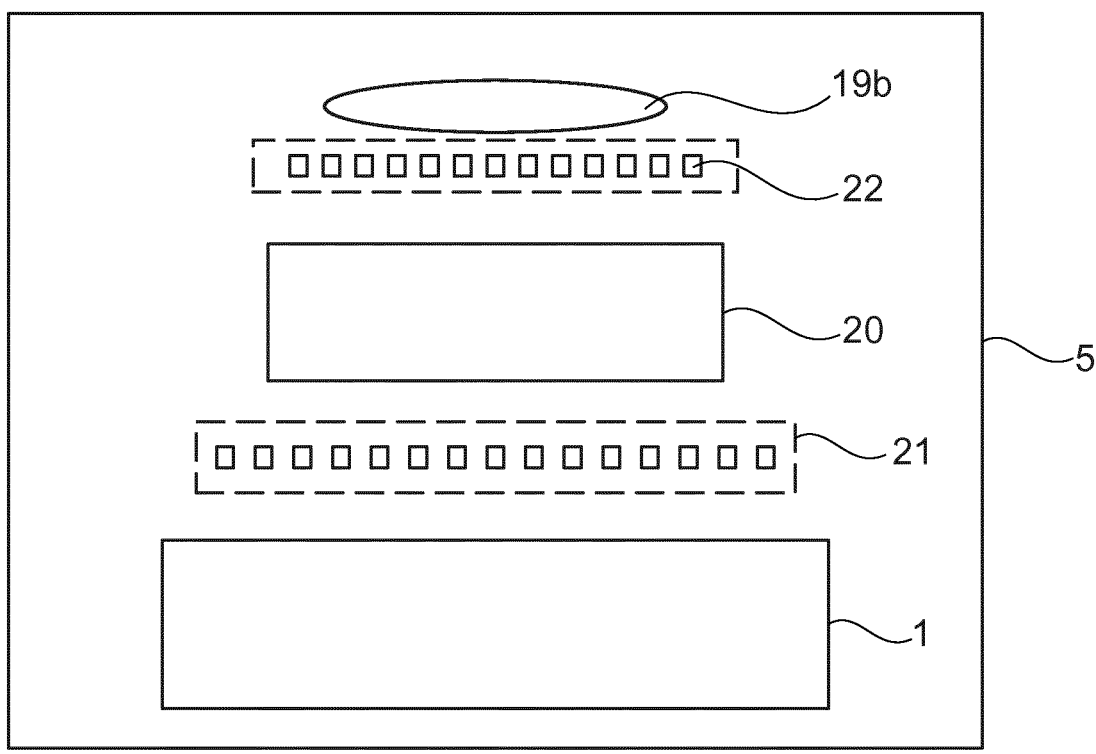
Fig. 3b
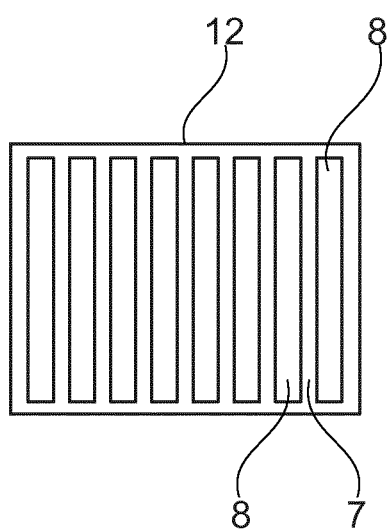 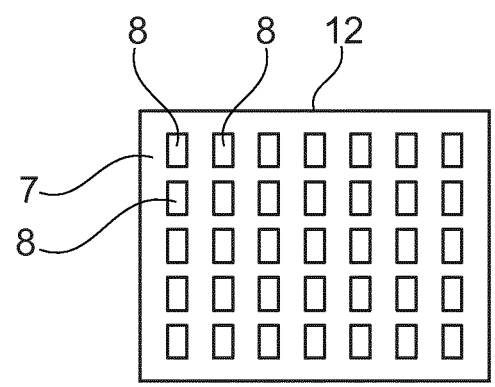
Fig. 4a  Fig. 4b

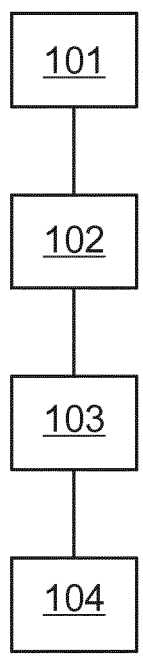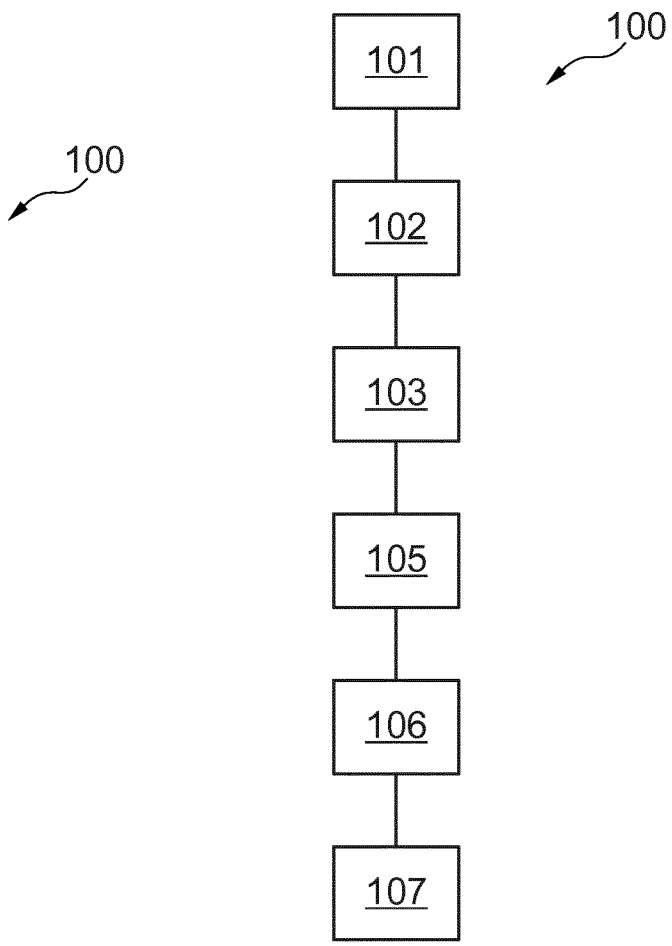
Fig. 5
Fig. 6

DETECTOR ARRANGEMENT FOR AN X-RAY PHASE CONTRAST SYSTEM AND METHOD FOR X-RAY CONTRAST IMAGING

FIELD OF THE INVENTION

The present invention relates to a detector arrangement and a system for an X-ray phase contrast system, and a method for X-ray phase contrast imaging.

BACKGROUND OF THE INVENTION

X-ray phase contrast imaging may be performed using Talbot-Lau type interferometers. Talbot-Lau type interferometer for differential phase contrast and dark field imaging are using a setup of gratings to obtain low angle scattering and differential phase information from the X-ray refraction. The so-called G2 grating is e.g. an analyzer grating to subsample the wave pattern in front of the X-Ray detector. The term "subsample" refers to that only distinct periodically arranged parts of the wave front are propagated and not absorbed. The technical design requirements for G2 are challenging. The G2 should have a small pitch between 2 μm to 50 μm. The absorber in the grating should be high-Z to have sufficient X-ray stopping power. This yields a high aspect ratio requirement. Furthermore, proper absorber materials such as gold are expensive. "A new method of detecting interferogram in differential phase-contrast imaging system based on special structured X-ray scintillator screen" (Liu Xin et al. Chin. Phys. B Vol. 19, No. 7 (2010) 070701) describes an X-ray phase contrast imaging device comprising a scintillator functioning as detector and analyzer grating. To produce that scintillator, a photo-electrochemical etching of silicon in hydrofluoric acid solution is performed. The fabrication comprises complicated steps like creating pore arrays in the silicon wafer, providing a wet-thermal oxidation of the wall of the pores and filling the pores with CsI(T1) crystals.

US 2017/0038481 A1 describes a photonic-channeled X-ray detector array comprising a scintillator that converts input X-ray radiation to secondary optical radiation output from the scintillator. A first telecentric micro lens array receives the secondary optical radiation and directs it to a phase coded aperture. The phase coded aperture directs the secondary optical radiation trough a second telecentric micro lens array to a patterned grating mask in front of a photodetector array.

SUMMARY OF THE INVENTION

There may thus be a need for a device having a cheap and easily producible analyzer grating.
The object of the present invention is solved by the subject-matter of the independent claims; further embodiments are incorporated in the dependent claims. It should be noted that the following described aspects of the invention apply also for the system for X-ray phase contrast imaging and the method for X-ray phase contrast imaging.

According to the present invention, in a first aspect a detector arrangement for an X-ray phase contrast system is provided, the detector arrangement comprising: a scintillator; an optical grating; and a detector. The optical grating is arranged between the scintillator and the detector. The scintillator converts X-ray radiation into optical radiation. The optical grating is configured to be an analyzer grating being adapted to a phase-grating of an X-ray phase contrast system. An optical path between the optical grating and the scintillator is free of focusing elements for optical radiation.

The term "optical" refers to the visible radiation spectrum.

The provisioning of an optical grating as analyzer grating between the scintillator and the detector may avoid the use of an X-ray absorber grating. The scintillator converts X-ray radiation which may comprise an X-ray radiation pattern of an object. The scintillator converts that X-ray radiation pattern to an optical radiation pattern. The optical grating then subsamples the optical radiation pattern into a subsampled optical radiation pattern which is then detected by the detector. The optical grating is easy to produce in relation to an X-ray absorber grating. Furthermore, the optical grating may be cheaper than an X-ray absorber grating.

The basic idea of the present invention is thus to avoid subsampling X-ray radiation with an X-ray absorber grating. Instead, the X-ray radiation may be converted to optical radiation prior to subsampling the X-ray radiation. That optical radiation may then be subsampled and detected.

Furthermore, the optical grating and the scintillator may form a compact optical element since the optical path between the optical grating and the scintillator is free of focusing elements for optical radiation. Thus, the optical grating may be arranged very close to the scintillator. This reduces the size of the setup and the amount of parts for the detector arrangment. Moreover, this simplifies the production of the setup and reduces the costs.

In a certain example, the optical grating is configured to be electronically adjustable.

Furthermore, in another example an LCD pixel array provides the optical grating. Preferably, the LCD pixel array is configured to provide a stepping of the optical grating.

According to an example, the detector arrangement comprises an optical polarizing unit. The optical polarizing unit is positioned between the optical grating and the scintillator.

The LCD pixel array is an active LCD pixel array being configured to dynamically change a polarization of the analyzer grating, i.e. the optical grating.

According to the present invention, in a second aspect a system for X-ray phase contrast imaging is provided, the system comprising: an X-ray interferometer setup with: a radiation source for emitting X-ray radiation; a phase grating; an object receiving space for arranging an object to be imaged; and a detector arrangement. The detector arrangement comprises: a scintillator; an optical grating; and a detector. The optical grating is arranged between the scintillator and the detector. The scintillator converts X-ray radiation into optical radiation. The optical grating is configured to be an analyzer grating being adapted to the phase grating of the system for X-ray phase contrast. An optical path between the optical grating and the scintillator is free of focusing elements for optical radiation.

By adapting the optical grating to the phase grating of the system the optical grating may be provided having an optimum pitch for the optimum imaging quality.

In a certain example, the optical grating comprises a pitch being adapted to the phase grating and to a distance between the optical grating and the radiation source. Due the adaptation to the distance between the optical grating and the radiation source, the imaging quality is further enhanced.

According to an example, the optical grating is configured to be electronically adjustable and is provided by an LCD pixel array. Preferably, the LCD pixel array is configured to provide a stepping of the optical grating. Further, the detector arrangement comprises an optical polarizing unit. The optical polarizing unit is positioned between the optical grating and the scintillator. The LCD pixel array is an active LCD pixel array being configured to dynamically change a polarization of the analyzer grating. The system further comprises a processing unit. The processing unit is configured to control the active LCD pixel array.

According to an example the radiation source is a point-like radiation source for emitting X-ray radiation.

According to a further example, the radiation source is a large-focused radiation source for emitting X-ray radiation. Furthermore, the system comprises an absorption grating between the radiation source and the object receiving space.

Further, according to the present invention, in a third aspect a method for X-ray phase contrast imaging is provided, the method comprising the following steps: a) converting X-ray radiation to optical radiation with a scintillator; b) subsampling the optical radiation with an optical grating resulting in a subsampled optical radiation pattern, wherein the optical path between the optical grating and the scintillator is free of focusing elements for optical radiation; and c) detecting the subsampled optical radiation pattern with a detector.

According to an example, the optical grating is provided by a pixel array. The method comprises the step: d) changing the position of the optical grating on a pixel array with a processing unit controlling the pixel array. In an example the pixel array is a bi-stable display. In another example the pixel array may be an active or passive LCD pixel array. According to an example, the subsampling is performed by e) polarizing the optical radiation with an optical polarizing unit resulting in a polarized optical radiation; and f) absorbing a portion of the polarized optical radiation with a polarization mask pattern on an active LCD array providing the optical grating.

In a certain example, the method comprises the step: g) changing a relative phase position of the polarization mask pattern with a processing unit controlling the active LCD array.

According to a fourth aspect of the present invention, a computer program element for controlling an apparatus described above is provided, the computer program, when being executed by a processing unit, is adapted to perform the method mentioned above.

In a fifth aspect of the present invention a computer readable medium having stored the program element mentioned above.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 4a, b show a schematic view of different embodiments of an optical grating;

FIG. 5 shows a schematic view of an embodiment of a method for X-ray phase contrast imaging;

FIG. 6 shows a schematic view of another embodiment of the method; and

DETAILED DESCRIPTION OF EMBODIMENTS

Figure 1:
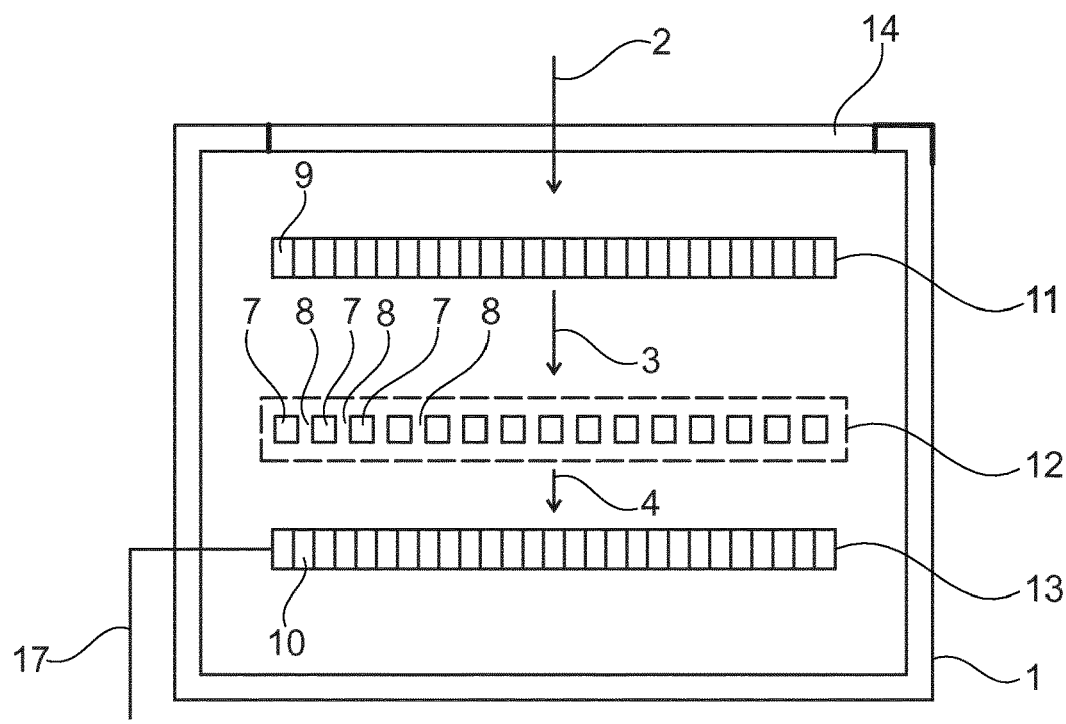
FIG. 1 shows a schematic view of an embodiment of the detector arrangement.

FIG. 1 shows an embodiment of a detector arrangement 1. The detector arrangement 1 comprises an X-ray transparent wall 14, a conversion unit, a subsampling unit, and a detection unit. The subsampling unit is arranged between the conversion unit and the detection unit.

The X-ray transparent wall 14 serves as inlet for X-ray radiation 2. In an example, the X-ray transparent wall 14 may be an opening in a side wall of the detector arrangement 1. In another example, the X-ray transparent wall 14 may be a massive wall being made from an X-ray transparent material.

The conversion unit comprises a plurality of conversion elements 9 being configured to convert X-ray radiation 2 into optical radiation resulting in optical radiation 3. In an example, the conversion unit is a high-resolution scintillator 11 having a pitch between 0.5 µm and 60 µm. The X-ray radiation 2 impacting the scintillator 11 is converted to optical radiation 3 by the scintillator 11. Thus, the scintillator 11 serves as a conversion unit for X-ray radiation 2. The scintillator 11 emits the optical radiation 3.

The subsampling unit comprises a mask pattern of a first plurality of opaque elements 7 and a second plurality of light transmitting areas 8. The mask pattern is configured to subsample the optical radiation 3 resulting in a subsampled optical radiation pattern 4.

The optical path between the conversion unit and the subsampling unit is free of focusing elements for optical radiation. This means that the optical radiation 3 that is emitted by the scintillator 11 is immediately received by the subsampling unit without propagating through focusing elements like lenses or curved mirrors.

In an example, the subsampling unit is an optical grating 12 having a pitch between 1 µm and 60.5 µm wherein the pitch of the optical grating 12 is higher than the pitch of the scintillator 11. The optical radiation 3 being emitted by the scintillator 11 propagates to the optical grating 12. The propagation of the optical radiation takes place directly, i.e. without any focusing elements for influencing optical radiation in the optical path between the scintillator 11 and the optical grating 12. The optical grating 12 subsamples the optical radiation 3 by absorbing a mask pattern from the optical radiation 3. Therefore, the optical grating 12 serves as a subsampling unit for optical radiation 3. Due to the propagation through the optical grating 12 the optical radiation 3 is converted into a subsampled optical radiation pattern 4.

Due to the lack of focusing elements for optical radiation in the optical path between the scintillator 11 and the optical grating 12, in an exemplary embodiment of the detector arrangement 1, the optical grating 12 may be arranged close to the scintillator 11. This reduces the size of the detector arrangement 1.

The detection unit comprises a plurality of light detection elements 10 being configured to convert the subsampled optical radiation pattern 4 into an electrical image signal representing the subsampled optical radiation pattern 4.

In an example, the detection unit is a detector 13 which may be a photodiode array. The detector 13 measures the spatial distribution and the intensity of the optical radiation pattern 4 turning the optical radiation pattern 4 into am image signal. The detector 13 serves as a detection unit for optical radiation. The detector 13 transmits the electrical image signal by a signal line 17.

Figure 2A:
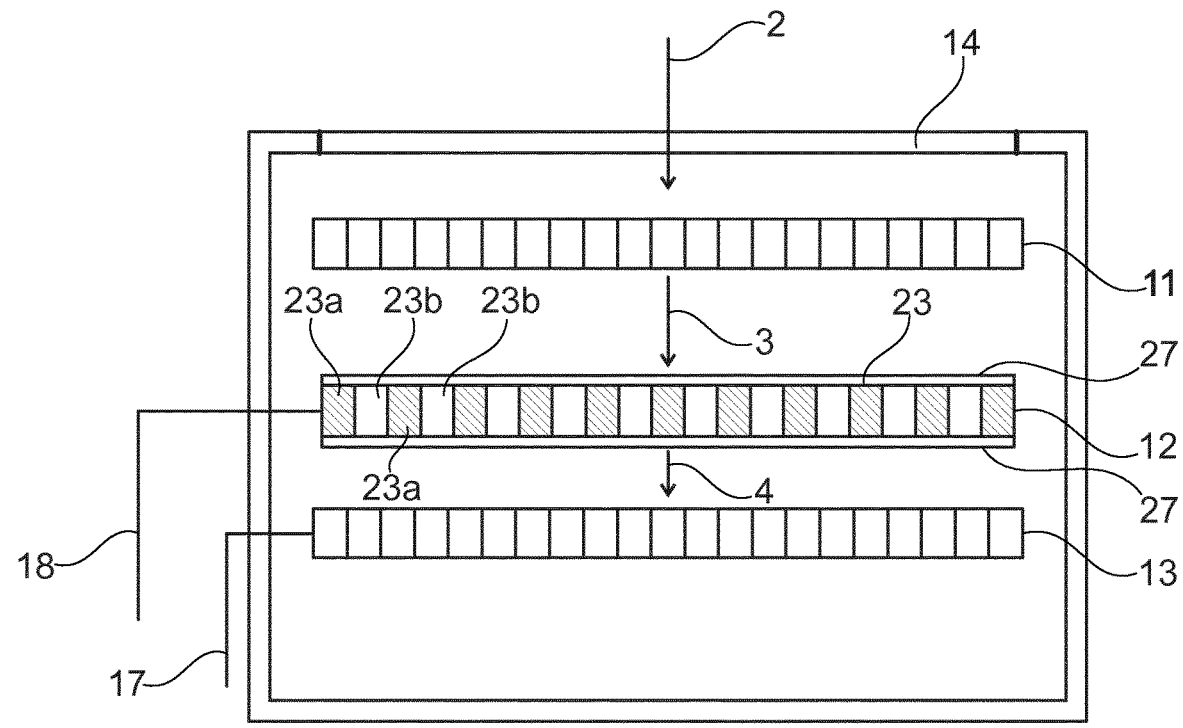
FIG. 2a, b show schematic views of two embodiments of the detector arrangement with an electronically adjustable optical grating.
Figure 2B:
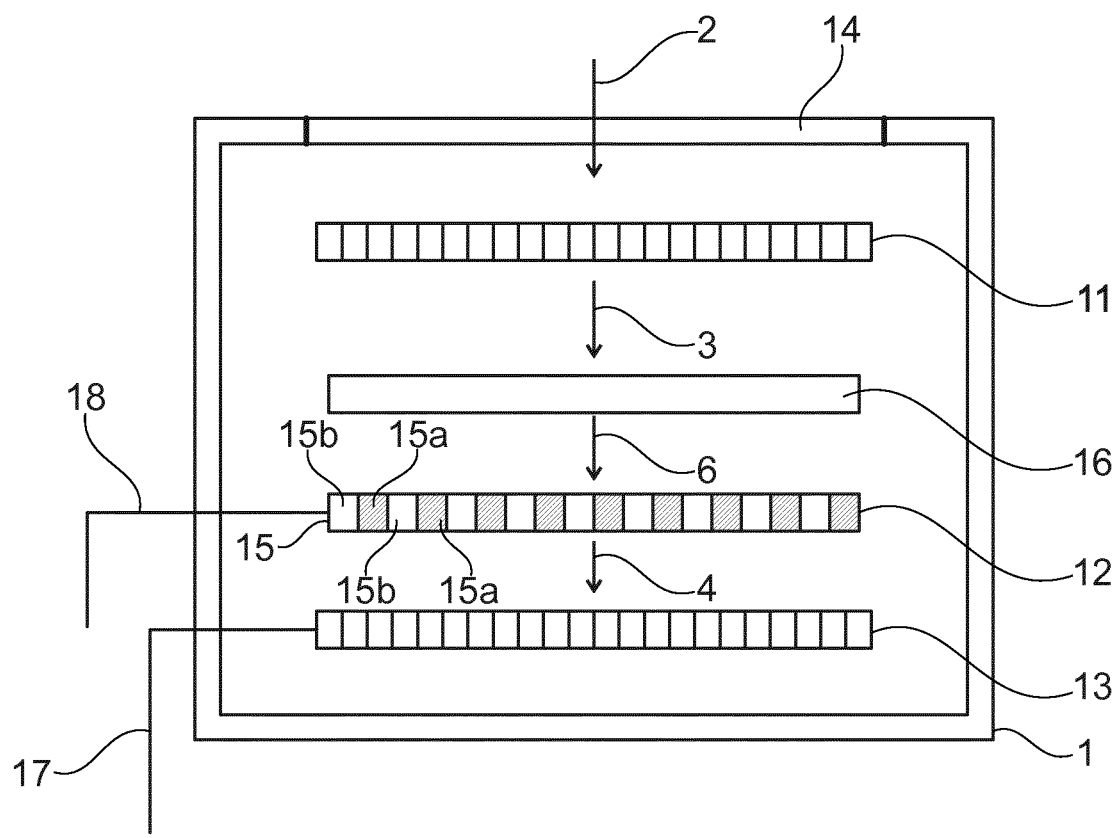

FIGS. 2a and 2b show embodiments wherein the optical grating 12 is controlled by electric activation. For example, the optical grating is provided by a bi-stable display, like electronic ink. In another example, the optical grating is provided by a switchable pixel array. An example wherein the optical grating 12 is provided by a bi-stable display 23 is shown in FIG. 2a. The bi-stable display 23 may comprise electronic ink between two arrays of transparent electrodes 27. The two array are controlled by control signals being provided by a signal line 18. The electronic ink may be arranged into a mask pattern for optical radiation by controlling the two arrays of transparent electrodes 27. The mask pattern is provided by light absorbing dark regions 23a of the bi-stable display 23. The optical radiation 3 may propagate through the bi-stable display 23 by passing light transmissive regions 23b of the bi-stable display 23.

The mask pattern provided by the bi-stable display 23 may be shifted in position by correspondingly controlling the two arrays of transparent electrodes 27. The position shifting provides a phase stepping functionality to the detector arrangement 1 avoiding mechanical movement.

In a further example shown in FIG. 2b, the subsampling unit is an active LCD pixel array 15 providing the optical grating 12. Furthermore, the active LCD pixel array 15 provides a stepping of the optical grating 12.

In this example, an optical polarizing unit 16 is positioned between the scintillator 11 and the active LCD pixel array 15. The optical polarizing unit 16 polarizes the optical radiation 3 and turns it into polarized optical radiation 6, i.e. the active LCD pixel 15 array receives polarized optical radiation 6.

The liquid crystal cells LCD can dynamically change the polarization direction and hence control the optical opacity. The active LCD pixel array 15 is thus configured to change the relative phase position of the optical grating 12, i.e. the active LCD pixel array 15 provides a dynamic change of the relative phase position of the optical grating 12. Therefore, the active LCD pixel array 15 may dynamically modify the absorbing pattern of the polarized optical radiation 6.

By changing the relative phase position of the optical grating 12 dynamically, the subsampling unit may provide the phase stepping functionality in the detector arrangement 1 avoiding mechanical movement. Furthermore, the response time of the active LCD pixel array 15 is faster than the response time of the bi-stable display 23. Therefore, by using the active LCD pixel array 15 a faster phase stepping may be performed.

Figure 3A:
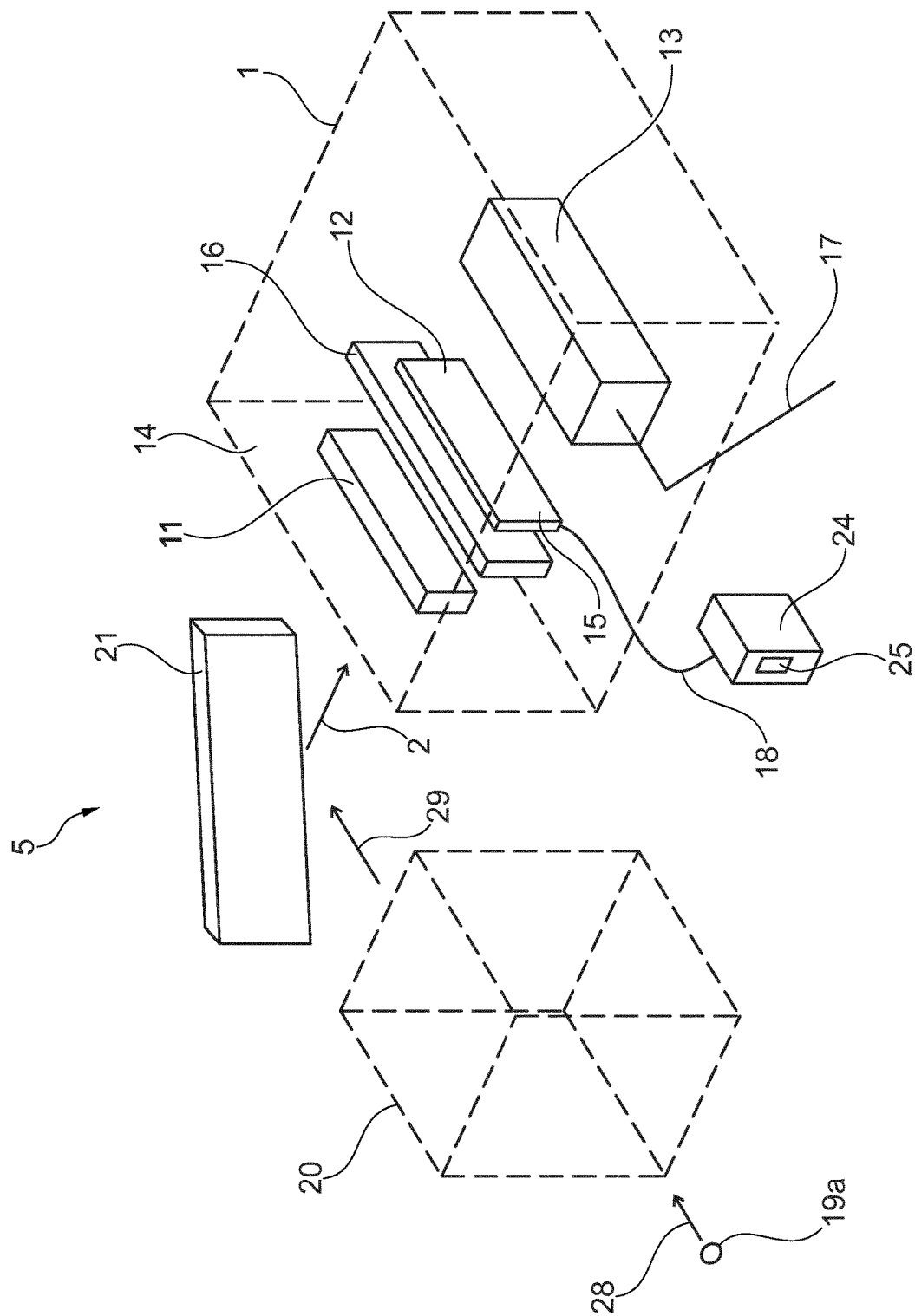
FIG. 3a, b show schematic views of embodiments of the system for X-ray phase contrast imaging with a a) small-focused and an b) large-focused X-ray radiation source.

FIG. 3a shows an embodiment of the system for X-ray phase contrast imaging 5. In an example, the system 5 comprises a focused X-ray radiation source 19a, an object receiving space 20, a phase grating 21 and a detector arrangement 1 according to one of the above embodiments. The focused X-ray radiation source 19a may be a point-like X-ray radiation source 19a, i.e. a small-focused X-ray radiation source 19a.

The focused X-ray radiation source 19a emits source X-ray radiation 28. The source X-ray radiation 28 propagates to the object receiving space 20. Objects which shall be examined by the system 5 may be placed in the object receiving space 20.

The source X-ray radiation 28 passes the object receiving space 20. An object being placed in the object receiving space 20 influences the source X-ray radiation 28 by absorption and/or phase shifting. The passage of the object receiving space 20 turns the source X-ray radiation 28 into object X-ray radiation 29 comprising information about an object in the object receiving space 20. The information about the object may be comprised in a wave pattern of the object X-Ray radiation 29.

In a certain example, the phase grating 21 is arranged between the object receiving space 20 and the detecting unit. In an example, the phase grating 21 is arranged between the object receiving space 20 and the detector arrangement 1. The phase grating 21 is configured to supply an X-ray radiation pattern of an object arranged in the object receiving space 20. The X-ray radiation pattern is emitted by the phase grating 21 as X-ray radiation 2. The X-ray radiation 2 then propagates to the detector arrangement 1.

In a further example (not shown), the phase grating 21 is arranged between the X-ray radiation source 19a and the object receiving space 20. This is the so-called inverse geometry setup. The X-ray radiation 28 then passes the phase grating 21 before passing the object receiving space 22. The detector arrangement 1 converts the X-ray radiation 2 into an electrical image signal as described for the above embodiments. That embodiment of the detector arrangement 1 comprises an electronically adjustable optical grating 12. The system 5 further comprises a processing unit 24 which controls the electronically adjustable optical grating 12 via signal line 18.

In a further example being shown in FIG. 3b, the system 5 comprises an X-ray radiation source being a large-focused X-ray radiation source 19b. The large-focused X-ray radiation source 19b may comprise an extended surface emitting X-ray radiation. Furthermore, the large-focused X-ray radiation source 19b may be an incoherent X-ray radiation source.

In that embodiment, the system 5 comprises an absorption grating 22, in particular a G0-grating, arranged between the large-focused X-ray radiation source 19b and the object receiving space 20. The absorption grating 22 creates a plurality of focused X-ray radiation sources from the X-ray radiation passing the absorption grating 22. X-rays emitted by those focused X-ray radiation sources propagate to the object receiving space 20 as source X-ray radiation 28.

In an example, the object receiving space 20 is arranged between the X-ray radiation source 19b and the phase grating 21.

In another example (not shown), the phase grating 21 is arranged between the X-ray radiation source 19b and the object receiving space 20. FIG. 4a shows an embodiment of the optical grating 12. In an example, the optical grating 12 comprises at least one opaque element 7 forming an opaque region. Further, the optical grating 12 comprises light transmitting elements 8 forming a plurality of parallel slits in the opaque region. In combination with the light transmitting elements 8 the opaque region forms a mask pattern for the optical radiation 3.

The distance between two slits is the stepping of the optical grating 12. The stepping of the optical grating 12 may be between 1 μm and 60.5 μm. The stepping may be constant for all light transmitting elements 8. The distance between the centers of two slits is the pitch of the optical grating 12. The pitch of the optical grating 12 may also be constant. FIG. 4b shows another embodiment of the optical grating 12. The optical grating 12 comprises at least one opaque element 7 having a plurality of light transmitting elements 8. The light transmitting elements 8 form a matrix of light transmitting regions in the opaque region formed by the opaque element 7. The matrix is regularly formed, i.e. the distance between the light transmitting elements in each row and column is the same. The combination of the plurality of light transmitting elements 8 and the opaque element 7 forms a mask pattern for optical radiation.

The method 100 for X-ray phase contrast imaging may be performed by a system 5 comprising an X-ray radiation source, an object receiving space 20, a phase grating 21, and a detector arrangement 1. The detector arrangement 1 may comprise a conversion unit, a subsampling unit and a detection unit. The conversion unit may be a scintillator 11. The subsampling unit may be an optical grating 12 which may be provided by for example a bi-stable display 23 or an active LCD pixel array 15. The optical path between the optical grating 12 and the scintillator 11 is free of focusing elements for optical radiation. Furthermore, the detector arrangement 1 may comprise a polarizing unit 16. A processing unit 25 may control the bi-stable display 23 or the active LCD pixel array 15, respectively.

FIG. 5 shows an embodiment of a method 100 for X-ray phase contrast imaging. In that embodiment of the method 100, the method 100 is performed with on optical grating 12 being provided by a pixel array. The pixel array may for example be provided by a bi-stable display 23 or an active LCD pixel array 15.

In step 101 the X-ray radiation 2 is converted to optical radiation 3 with a scintillator 11. The scintillator 11 may be a component of a detector arrangement 1 as being described above.

In the next step 102 the optical radiation 3 being created in step 101 is subsampled with an optical grating 12, wherein between step 101 and step 102 the optical radiation does not pass any focusing elements. The subsampling is provided by a mask pattern which is provided by the optical grating 12. This means that a part of the optical radiation 3 is absorbed by the optical grating 12. This results in emission of a subsampled optical radiation pattern 4.

In step 103 the subsampled optical radiation pattern 4 is detected by a detector 13. The detector 13 may detect the spatial distribution of the subsampled optical radiation pattern 4 and/or the intensity of the subsampled optical radiation pattern 4.

In step 104 the position of the optical grating 12 being provided by the pixel array is changed by controlling the pixel array with the processing unit 25. This results in a phase stepping functionality of the system 5 avoiding mechanical movement.

In another embodiment being shown in FIG. 6, the method 100 is performed with a system 5 comprising a polarizing unit 16. The pixel array may then for example be provided by an active LCD pixel array 15.

This embodiment of the method 100 comprises the steps 101, 102 and 103 being described above. After step 103, in step 105 the optical radiation 3 is polarized with a polarizing unit 16 resulting in a polarized optical radiation 6.

In step 106 a portion of the polarized optical radiation 6 is absorbed by a polarization mask pattern on an active LCD pixel array 15. This results in the radiation of a subsampled optical radiation pattern 4.

In step 107 the relative phase position of the polarization mask pattern on the active LCD pixel array 15 is changed by the processing unit 24 controlling the active LCD every 15. This allows a phase stepping functionality in the system 5 without mechanical movements.

In another exemplary embodiment of the present invention, a computer program or a computer program element 25 is provided, that is characterized by being adapted to execute the method steps of the method according to one of the preceding embodiments, on an appropriate system, for example the processing unit 24.

The computer program element 25 might therefore be stored on a computing unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element 25 might be able to provide all necessary steps to fulfil the procedure of an exemplary embodiment of the method as described above.

Figure 7:
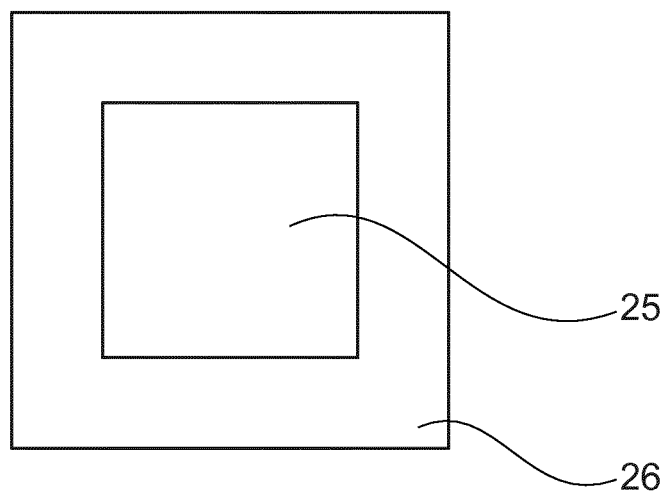
FIG. 7 shows a schematic view of an embodiment of a computer readable medium with an embodiment of a computer program element for performing at least one embodiment of the method.

According to a further exemplary embodiment of the present invention shown in FIG. 7, a computer readable medium 26, such as a CD-ROM, is presented wherein the computer readable medium 26 has a computer program element 25 stored on it which computer program element 25 is described by the preceding section. A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

The computer program element 25 for example may run on the processing unit 24 being adapted to receive the computer program element 25 by a computer readable medium 26 or over a network as described above. The computer program element 25 therefore, may enable the processing unit 24 to perform a phase stepping of an electronically adjustable optical grating 12.

It should be noted that embodiments of the invention are described regarding different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated, and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A detector arrangement for an X-ray phase contrast system, the detector arrangement comprising:
    a scintillator configured to convert X-ray radiation into optical radiation;
    an optical grating configured to be an analyzer grating which is adapted to a phase-grating of an X-ray phase contrast system; and
    a detector configured to detect the optical radiation, wherein the optical grating is located between the scintillator and the detector, wherein an optical path between the optical grating and the scintillator is free of focusing elements for the optical radiation, and wherein the optical grating is configured to be electronically adjustable.

2. The detector arrangement according to claim 1, further comprising an LCD pixel array configured to provide the optical grating; and wherein the LCD pixel array is configured to provide a stepping of the optical grating.

3. The detector arrangement according to claim 2, further comprising an optical polarizing unit positioned between the optical grating and the scintillator; and
    wherein the LCD pixel array is configured to dynamically change a polarization of the analyzer grating.

4. A system for X-ray phase contrast imaging, the system comprising:
    an X-ray interferometer comprising:
        a radiation source for emitting X-ray radiation;
        an object receiving space for arranging an object to be imaged;
        a phase grating; and
    a detector arrangement comprising:
        a scintillator configured to convert X-ray radiation into optical radiation;
        an optical grating configured to be an analyzer grating which is adapted to a phase-grating of an X-ray phase contrast system; and
        a detector configured to detect the optical radiation, wherein the optical grating is located between the scintillator and the detector, wherein an optical path between the optical grating and the scintillator is free of focusing elements for the optical radiation, and wherein the optical grating is configured to be electronically adjustable.

5. The system according to claim 4, wherein the optical grating comprises a pitch being adapted to the phase grating and to a distance between the optical grating and the radiation source.

6. The system according to claim 4, further comprising an LCD pixel array configured to provide the optical grating and at least one processor configured to control the LCD pixel array.

7. The system according to claim 4, wherein the radiation source is a point-like radiation source for emitting the X-ray radiation.

8. The system according to claim 4, wherein the radiation source is a large-focused radiation source for emitting the X-ray radiation; and wherein the system further comprises an absorption grating located between the radiation source and the object receiving space.

9. A method for X-ray phase contrast imaging, the method comprising:
    converting X-ray radiation to optical radiation using a scintillator;
    subsampling the optical radiation using an optical grating resulting in a subsampled optical radiation pattern, wherein an optical path between the optical grating and the scintillator is free of focusing elements for the optical radiation; and
    detecting the subsampled optical radiation pattern using a detector.

10. The method according to claim 9, further comprising:
    providing the optical grating by a pixel array; and changing a position of the optical grating on the pixel array by at least one processor configured to control the pixel array.

11. The method according to claim 9, further comprising:
    polarizing the optical radiation resulting in a polarized optical radiation; and
    absorbing a portion of the polarized optical radiation with a polarization mask pattern on an LCD pixel array providing the optical grating.

12. The method according to claim 11, further comprising:
    changing a relative phase position of the polarization mask pattern by at least one processor configured to control the LCD pixel array.

13. A non-transitory computer-readable medium having one or more executable instructions stored thereon, which, when executed by at least one processor, cause the at least one processor to perform a method for X-ray phase contrast imaging, the method comprising:
    converting X-ray radiation to optical radiation using a scintillator;
    subsampling the optical radiation using an optical grating resulting in a subsampled optical radiation pattern, wherein an optical path between the optical grating and the scintillator is free of focusing elements for the optical radiation; and
    detecting the subsampled optical radiation pattern using a detector.

* * * * *